United States Patent [19]

Neeleman et al.

[11] Patent Number: 5,280,141
[45] Date of Patent: Jan. 18, 1994

[54] PRESSURE COMPENSATING DIAPHRAGM FOR A WEIGHING CELL

[75] Inventors: Christiaan Neeleman, Zurich; Jean-Christope Emery, Schwerzenbach, both of Switzerland

[73] Assignee: Mettler-Toledo AG, Greifensee, Switzerland

[21] Appl. No.: 891,900

[22] Filed: Jun. 1, 1992

[30] Foreign Application Priority Data

Jun. 5, 1991 [CH] Switzerland ............ 1669/91-2

[51] Int. Cl.$^5$ ............ G01G 21/28; G01G 3/14
[52] U.S. Cl. ............ 177/238; 177/211
[58] Field of Search ............ 177/211, 238

[56] References Cited

U.S. PATENT DOCUMENTS

| | | | |
|---|---|---|---|
| 4,285,412 | 8/1981 | Wirth | 177/179 |
| 4,718,287 | 1/1988 | Mishliborsky | 177/211 X |
| 4,804,053 | 2/1989 | Nordstrom | 177/211 |
| 4,957,177 | 9/1990 | Hamilton et al. | 177/211 |

Primary Examiner—George H. Miller, Jr.
Attorney, Agent, or Firm—Anderson Kill Olick & Oshinsky

[57] ABSTRACT

A pressure compensating device includes a hermetically encapsulated weighing cell for neutralizing an excess pressure or a negative pressure within the encapsulation relative to a surrounding space. A pressure compensating diaphragm is connected to a protective housing in an essentially sealing manner, but without significant resistance and non-deformable relative to an initial tension. The pressure compensating diaphragm is of an extremely flexible material and the surface area thereof is large relative to the dimensions of the encapsulation. The pressure-compensating device preferably is a structural group mounted on the protective housing in which at least one pressure-compensating diaphragm is arranged so as to be protected against mechanical or chemical damage.

9 Claims, 3 Drawing Sheets

PRESSURE COMPENSATING DIAPHRAGM FOR A WEIGHING CELL

BACKGROUND OF THE INVENTION

1. Field of the Invention

The present invention relates to a pressure compensating device with a pressure compensating diaphragm for an encapsulated weighing cell for neutralizing an excess pressure or a negative pressure within a protective housing relative to the space surrounding the protective housing.

2. Description of the Related Art

In a balance protected against dust and water known from EP 00 35 579, the measuring system is completely enclosed by a protective housing, wherein the legs of the balance extend through the protective housing and are connected to the latter by means of annular diaphragms which act as sealing means for the protective housing. Moreover, in balances having a small maximum load, means for compensating the pressure differences are provided. These means are porous inserts or bellows which are provided at the bottom side of the protective housing and which are arranged at openings of the protective housing.

However, the arrangement described above has the disadvantage that it does not operate sufficiently effectively in practice. Because of its stiffness resulting from its shape, the bellows is substantially ineffective for the relatively very small and quick pressure differences between the surrounding space and the inner space of the protective housing. This is particularly true when short reaction times of the balance are required, as is the case in industrial applications in which the balance is used within a process apparatus at locations corresponding to the process steps. The embodiment utilizing the porous cover of the pressure compensating opening in the protective housing has the additional disadvantage that it may become at least partially ineffective when the pores are clogged by dust or the like created during the production process and the measuring accuracy decreases as a result. Especially this possibility is particularly dangerous in processes in which the weighing accuracy must meet very high requirements and the weighing accuracy must remain constant over long periods of time.

SUMMARY OF THE INVENTION

Therefore, it is the object of the present invention to eliminate the disadvantages described above and to provide a weighing cell with a pressure compensating means which is maintained uniformly over long periods of time and independently of the surrounding influences due to dust or moisture and which becomes effective even in cases of extremely small pressure differences.

In accordance with the present invention, the above objects are met by arranging the pressure compensating diaphragm at the protective housing in an essentially sealing manner, but without significant resistance and non-deformable relative to an initial tension. In addition, the pressure compensating diaphragm is made of an extremely flexible material. The surface area of the pressure compensating diaphragm is large relative to the dimensions of the encapsulation.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENTS

In a first embodiment of the pressure compensating device according to the present invention, in a protective housing 1 for a measuring cell of a balance is arranged an essentially prismatic body which penetrates the protective housing and has a large surface area relative to the protective housing. The surface of the penetration body is formed by a pressure compensating diaphragm 2 which with its free edges is tightly connected to the protective housing 1.

Figure 1A:
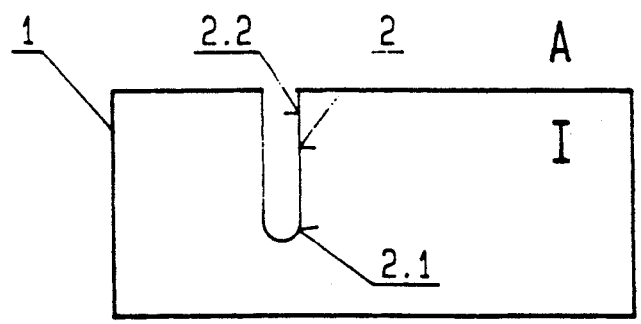
FIGS. 1a and 1b are a sectional view and a perspective view of a first embodiment of the pressure compensating device according to the present invention.
Figure 1B:
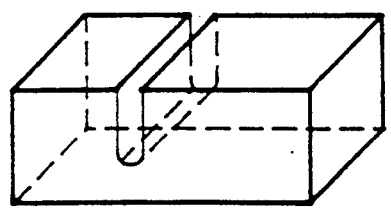

In a first modification of the first embodiment of the pressure compensating device shown in FIGS. 1a and 1b, the penetration body has a cylindrical U-shape whose surfaces are formed by the pressure compensating diaphragm 2. Also in this case, one side 2.2 of the pressure compensating diaphragm 2 is in contact with the surrounding space A and the other side 2.1 of the pressure compensating diaphragm 2 is in contact with the inner space I of the protective housing 1.

Figure 2A:
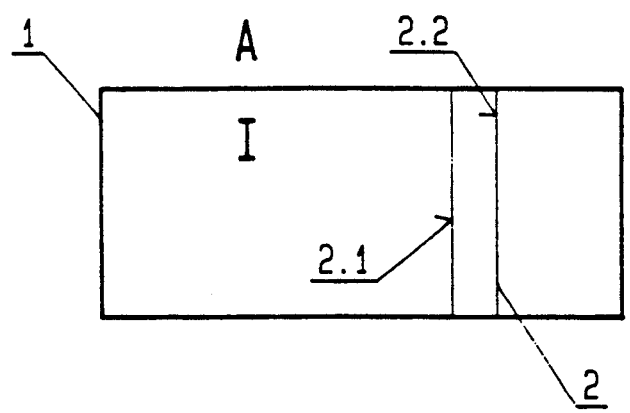
FIGS. 2a and 2b are a sectional view and a perspective view of a modification of the first embodiment of the pressure compensating device according to the present invention.
Figure 2B:
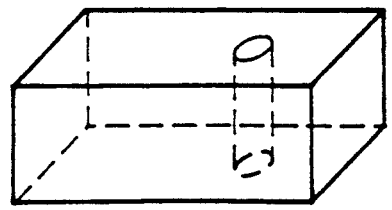

In a second modification of the first embodiment of the pressure compensating device shown in FIGS. 2a and 2b, the penetration body has a cylindrical tubular shape which is open at the end faces thereof and the surfaces thereof are formed by the pressure compensating diaphragm 2. As a result, one side 2.2 of the pressure compensating diaphragm 2 is in contact with the surrounding space A and the other side 2.1 of the pressure compensating diaphragm 2 is in contact with the inner space I of the protective housing 1.

Figure 3:
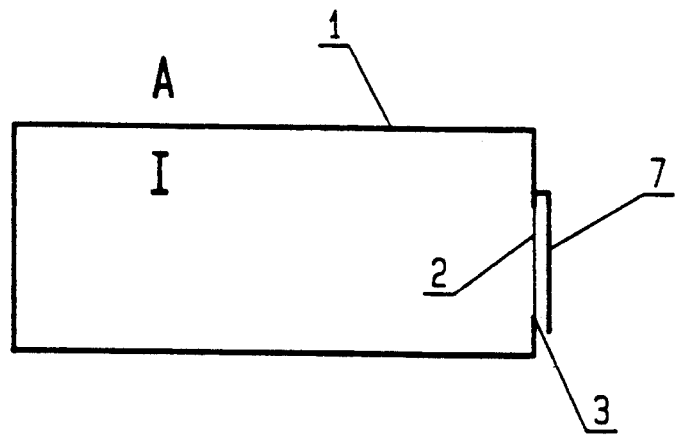
FIG. 3 is a sectional view of another modification of the first embodiment of the pressure compensating device according to the present invention.

In a third modification of the first embodiment of the pressure compensating device shown in FIG. 3, the pressure compensating diaphragm 2 is arranged in a relatively large window 3 of an end face of the protective housing 1 and is also tightly connected to the edges of the window 3. However, the window 3 may also be arranged at any other suitable side face of the protective housing 1. This window 3 is provided with an air-permeable protective cover 7 for protecting the pressure compensating diaphragm 2 against chemical and/or mechanical damage. The protective cover 7 is placed on the protective housing 1.

In the modifications of the first embodiment described above, the pressure compensating diaphragm 2 is connected relatively loosely to the corresponding edges of the protective housing 1, so that the pressure compensating diaphragm 2 is not tensioned and provides essentially no resistance when displaced during pressure compensation as a result of a pressure imbalance between surrounding space A and inner space I.

Figure 4:
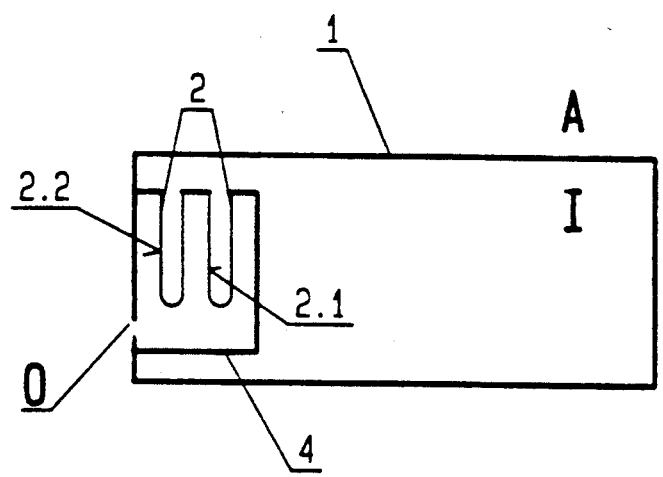
FIG. 4 is a sectional view of a second embodiment of the pressure compensating device.

In a second embodiment of the pressure compensating device shown in FIG. 4, the pressure compensating diaphragm 2 is bag-shaped. Two bag-shaped diaphragms 2 are placed hanging loosely with the bag openings facing upwardly in a structural group which is constructed as a trough 4. First sides 2.1 of the pressure compensating diaphragm 2 border against the inner space I and second sides 2.2 border against the surrounding space A of the protective housing 1. The trough-shaped structural group is tightly connected to the protective housing 1. An opening 0 is provided in the inner wall of the protective housing 1 in the interior of the trough-shaped structural group. However, the bag-shaped pressure compensating diaphragm 2 can also be placed hanging loosely in the trough with the bag opening facing downwardly.

Figure 5:
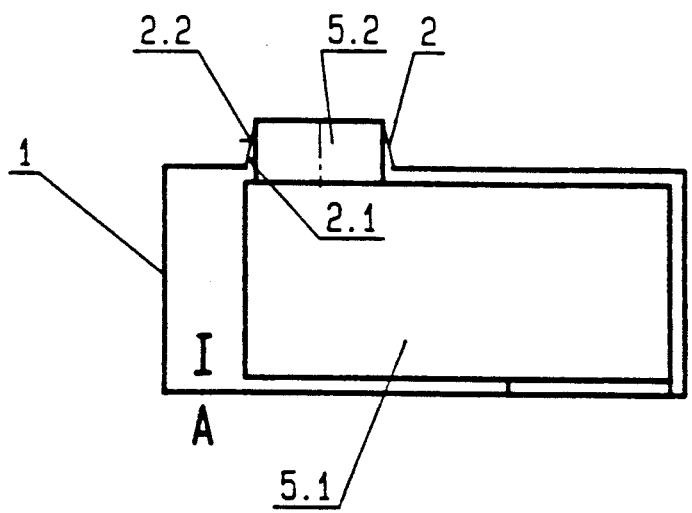
FIG. 5 is a sectional view of a third embodiment of the pressure compensating device.

In a third embodiment of the pressure compensating device shown in FIG. 5, the pressure compensating diaphragm 2 is bag-shaped and is placed over a load-bearing arm 5.2 of a measuring cell 5.1 which is arranged in the protective housing 1 and is connected to the load-bearing arm 5.2. The load-bearing arm 5.2 projects out of the protective housing 1. The pressure compensating diaphragm 2 is tightly connected to the edges of the opening of the protective housing 1. Also in this case, the pressure compensating diaphragm 2 is to be placed loosely hanging over the load-bearing arm 5.2 of the measuring cell 5.1, so that even the smallest pressure differences between the two sides 2.1 and 2.2, respectively, of the pressure compensating diaphragm 2 can be compensated. Moreover, in the embodiment shown in FIG. 5, the pressure compensating diaphragm 2 simultaneously serves the purpose of being a sealing diaphragm.

Figure 6:
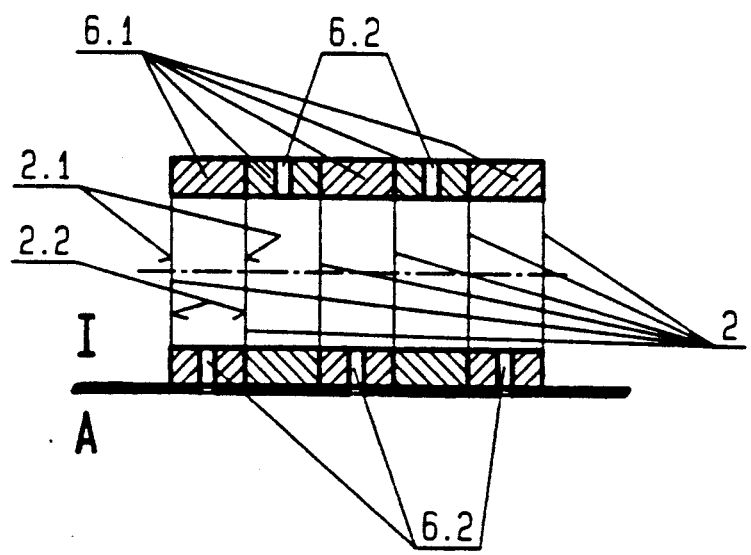
FIG. 6 is a sectional view of a fourth embodiment of the pressure compensating device.

In a fourth embodiment of the pressure compensating device shown in FIG. 6, the pressure compensating diaphragm 2 is disk-shaped. Each disk is attached to at least one of corresponding diaphragm support rings 6.1 which form a type of battery. The diaphragm support rings 6.1 are provided with bores 6.2 which are connected alternatingly from diaphragm support ring to diaphragm support ring to the surrounding space A and the inner space I of the protective housing 1 between which spaces the pressure compensation is to take place. However, each diaphragm support ring 6.1 may also have a pressure compensating diaphragm 2 which is loosely suspended in the ring 6.1. The important aspect in these embodiments is that at least one diaphragm support ring 6.1 has a loosely suspended pressure compensating diaphragm 2 which separates the inner space I from the surrounding space A of the protective housing 1.

Moreover, it is important in all embodiments that the effective surface area of the pressure compensating diaphragm 2 is relatively large as compared to the dimensions of the protective housing 1 and that the material of the diaphragm 2 is particularly flexible, so that it reacts by deformation without significant reactive forces to even the smallest pressure differences between the surrounding space A and the inner space I of the protective housing 1. In certain types of balances, in order to obtain particularly high weighing accuracies, the ratio between the pressure difference without a pressure compensating device and the pressure difference with a pressure compensating device should be several hundred.

The second and fourth embodiments of the present invention have the advantage that the pressure compensating diaphragm 2 can be arranged in the form of batteries and, thus, have a very high effectiveness. This is true especially because each individual diaphragm must be deformed only very slightly in order to contribute to the pressure compensation. Consequently, the inner reactive forces or the inner resistance at each individual pressure compensating diaphragm which is deformed and tensioned is particularly small.

Several parameters have an influence on the determination of the effective surface area of the pressure compensating diaphragm. Such parameters include the display resolution (least displayed digit) of the balance, the properties of the material used for the diaphragm, and the pressure differences that may be expected when the balance is operated.

A balance having a display resolution of 0.1 g was provided with a pressure compensating diaphragm having a surface area of, e.g., appr. 6000 mm$^2$. In other cases smaller diaphragms may be sufficient, down to an effective surface area of 300 . . . 400 mm$^2$.

The pressure compensating diaphragm according to the instant invention is especially important for use in weighing cells with a encapsulating membrane (protecting the cell from dust and/or moisture) that has a significant horizontal portion. Such encapsulating membranes are typically used for protecting the place where the load receiver protrudes the cell casing. Especially in these cases, air pressure variations have an effect as (vertical) disturbing forces that tend to falsify the weighing results. This effect may be tolerable in balances with relatively rough display resolutions (e.g. 1 g or more), but calls for compensation in balances with finer display resolution (e.g. 0.1 g or less).

While specific embodiments of the invention have been shown and described in detail to illustrate the inventive principles, it will be understood that the invention may be embodied otherwise without departing from such principles.

We claim:

1. A pressure compensating device for compensating a pressure difference between pressures inside and outside of a protective housing for a weighing cell, wherein said pressure compensating device comprises:
    a diaphragm which is formed of a flexible material and which is supported on the protective housing in an essentially sealing manner and in a non-tensioned state such that it enables a substantially resistance-free displacement of said diaphragm relative to the protective housing, and further wherein said diaphragm has a surface area which is large relative to dimensions of the weighing cell.

2. The pressure compensating device according to claim 1, comprising a structural group mounted to an inside or an outside of the protective housing of the weighing cell, and means for protecting the at least one pressure compensating diaphragm against mechanical or chemical damage.

3. The pressure compensating device according to claim 2, wherein the structural group including the at least one pressure compensating diaphragm comprises at least one diaphragm support ring, wherein the at least one diaphragm support ring supports a pressure compensating diaphragm which separates the space within the protective housing from the space surrounding the protective housing.

4. The pressure compensating device according to claim 1, wherein the structural group which includes the at least one pressure compensating diaphragm is trough-shaped with the at least one pressure compensating diaphragm being bag-shaped and loosely suspended in the trough-shaped structural group, wherein one side of the pressure compensating diaphragm borders the space within the protective housing and another side of the pressure compensating diaphragm borders the space surrounding the protective housing.

5. The pressure compensating device according to claim 4, wherein the bag-shaped pressure compensating diaphragm has an opening, and wherein the pressure compensating diaphragm is mounted in the trough-shaped structural group with the opening facing upwardly.

6. The pressure compensating device according to claim 4, wherein the bag-shaped pressure compensating diaphragm has an opening, and wherein the pressure compensating diaphragm is mounted in the trough-shaped structural group with the opening facing downwardly.

7. The pressure compensating device according to claim 1, wherein the protective housing has an opening, the at least one pressure compensating diaphragm being mounted so as to cover the opening, further comprising a mechanical protection device surrounding the pressure compensating diaphragm.

8. The pressure compensating device according to claim 1, wherein the protective housing has openings on corresponding levels, the pressure compensating diaphragm connecting the openings of the protective housing, wherein a contour surface of the pressure compensating diaphragm extends at least partially through the protective housing, such that the pressure compensating diaphragm separates the space within the protective housing from the space surrounding the protective housing.

9. The pressure compensating device according to claim 1, wherein the at least one pressure compensating diaphragm is a cover for a device for introducing a force to be measured on the measuring cell.

* * * * *